United States Patent [19]
Puryear

[11] Patent Number: 5,320,303
[45] Date of Patent: Jun. 14, 1994

[54] THRUST WASHER STRUCTURE FOR FISHING REELS

[75] Inventor: John W. Puryear, Sapulpa, Okla.

[73] Assignee: Zebco Corporation, Tulsa, Okla.

[21] Appl. No.: 741,966

[22] Filed: Aug. 6, 1991

[51] Int. Cl.[5] .............................................. A01K 89/01
[52] U.S. Cl. .................................... 242/321; 242/234; 384/426
[58] Field of Search .............................. 242/234–240, 242/321; 384/300, 304, 420, 424, 425, 426, 427

[56] References Cited

U.S. PATENT DOCUMENTS

| | | | |
|---|---|---|---|
| 1,094,535 | 4/1914 | Cooper | 384/426 |
| 3,105,650 | 10/1963 | Kuether | 242/237 |
| 3,176,930 | 4/1965 | Miller et al. | 242/240 |
| 3,284,019 | 11/1966 | Wood | 242/239 |
| 3,298,628 | 1/1967 | Harrington et al. | 242/239 |
| 3,329,371 | 7/1967 | Willis et al. | 242/239 X |
| 3,950,047 | 4/1976 | Capelli | 384/300 X |
| 4,001,124 | 1/1977 | Hussey | 384/300 X |
| 4,582,368 | 4/1986 | Fujita et al. | 384/300 X |

Primary Examiner—Daniel P. Stodola
Assistant Examiner—Michael Mansen

[57] ABSTRACT

A thrust washer structure for dissipating axial frictional forces caused by a forward thrust of a pinion gear in a fishing reel having a deck plate with an axial bore through the deck plate and a bushing having a rearwardly facing surface and an axial cylindrical bore therein disposed within the bore deck plate. The reel further includes a center shaft having a pinion gear thereon disposed within the axial cylindrical bore of the bushing, the pinion gear extending rearwardly from the bushing. The thrust washer structure includes at least one thrust washer having two radial surfaces. One radial surface is in contact with a bushing. The coefficient of friction of the radial surface in contact with a bushing is such that when the thrust washer is subjected to a forward thrust and the center shaft is rotated, slippage does not occur between the bushing and the radial surface in contact therewith.

3 Claims, 1 Drawing Sheet

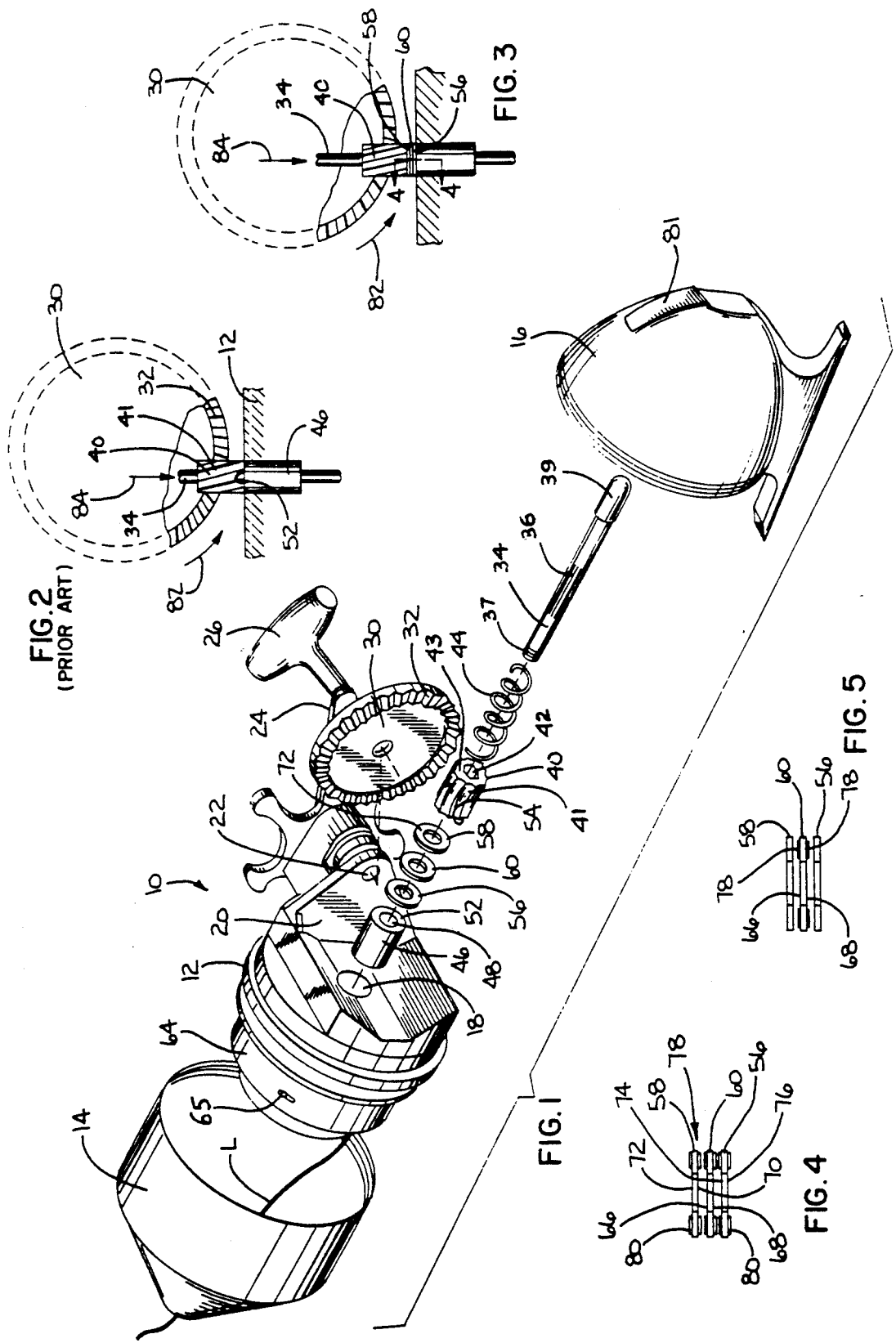

THRUST WASHER STRUCTURE FOR FISHING REELS

BACKGROUND OF THE INVENTION

1. Technical Field

The present invention is directed toward fishing reels and more particularly toward a thrust washer system for fishing reels.

2. Background Art

In one type of closed-faced spin cast fishing reel, a reel frame or deck plate has an axial bore for receiving a center shaft. Formed integral with the center shaft or splined thereon is a pinion gear having helical teeth. When the center shaft is disposed within the bore of the deck plate the pinion gear extends rearwardly from the deck plate. The reel further includes a face gear cooperatively interengaging the pinion gear. Attached to the drive gear is a drive shaft which in turn is attached to a crank handle. When the crank handle is rotated in a line retrieving direction the drive gear is rotated which in turn causes rotation of the pinion gear and the center shaft associated therewith. Because of the helical angle of the pinion gear teeth, the pinion gear is axially thrust forward against the deck plate when the pinion gear is caused to rotate in a line retrieving direction. In addition, the drive gear causes a radial loading on the center shaft when the drive gear rotates the center shaft.

Many reels seat a conventional ball bearing at the rearward portion of the deck plate to dissipate the frictional resistance to rotation of the center shaft caused by the forward thrust (or axial load) of the pinion gear and the radial load of the drive gear discussed above. However, such ball bearings are expensive, not readily available in small sizes required by fishing reels and hard to turn if grease used on the reel gears seeps into the ball area. Moreover, while these ball bearings are effective in alleviating radial frictional forces opposing rotation of the center shaft, they are not very effective in dissipating axial frictional forces caused by the forward thrust of the pinion gear, as for example when the center shaft is caused to turn in a line retrieving direction. In particular, conventional ball bearings do not hold up for long periods of time under the repeated forward thrust of the pinion gear.

As an alternative to conventional ball bearings, some reels used an angular contact bearing. Angular contact bearings are designed to stand up to the axial forward thrust of the pinion gear. However, angular contact bearings are more expensive than conventional ball bearings and are inferior to conventional ball bearings for facilitating rotation of the center shaft under radial loads.

Another device used in the art for facilitating rotation of the center shaft under axial and radial loads is an OILITE TM bushing inserted into the bore in the deck plate, the OILITE TM bushing having a center shaft receiving bore therein. As is readily appreciated by those skilled in the art, OILITE TM bushings are typically made of a porous brass or bronze alloy with a lubricant such as oil permeated into the pores of the bushing. When heat is generated such as by rotation of the center shaft within the busing, lubrication is released from the pores of the bushing. Use of an OILITE TM bushing to facilitate rotation of the center shaft in the deck plate is often preferred over conventional ball bearings and angular contact bearings because it is less expensive and often times more durable.

When a pinion gear having helical teeth is rotated in a line retrieving direction, thereby subjecting the OILITE TM bushing to a forward thrust, lubrication seeps from the pores of the rearward facing edge of the OILITE TM bushing to facilitate easy rotation of the pinion gear and associated center shaft. However, under heavy and sustained forward thrusts, such as when a large fish is being reeled in, excessive heat and friction can cause the surface of the OILITE TM bushing contacting pinion gear to be depleted of lubrication, thus increasing the coefficient of friction between the OILITE TM bushing and the pinion gear and causing binding between the OILITE TM bushing and the pinion gear. Besides making line retrieval more difficult, this binding increases the wear on the reel drive system, in particular, the wear between the pinion gear and drive gear.

SUMMARY OF THE INVENTION

The present invention facilitates utilization of OILITE TM bushings in fishing reels having pinion gears with helical teeth, thereby promoting the many advantages of such bushings, while at the same time eliminating the excessive friction between the pinion gear and the OILITE TM bushing and the associated gear wear and reel binding.

The present invention is directed to a thrust washer structure for reducing frictional loads caused by a forward thrust of a pinion gear mounted on a center shaft of a fishing reel. More particularly, the thrust washer structure is utilized in a fishing reel of the type having a deck plate with an axial bore through the deck plate. An OILITE TM bushing having a center shaft receiving bore therein is disposed within the axial bore through the deck plate. The center shaft is disposed within the axial cylindrical bore of the bushing such that the pinion gear extends rearwardly from the bushing. The thrust washer structure includes at least one thrust washer having two radial surfaces, one radial surface being in contact with the pinion gear and the other radial surface being in contact with the bushing. The coefficient of friction of the radial surface in contact with the bushing is such that when the thrust washer is subjected to a forward thrust and the center shaft is rotated, slippage does not occur between the bushing and the radial surface in contact therewith.

The thrust washer may have an antifriction coating on the radial surface not in contact with the bushing. Preferably, three thrust washers are used, including a middle thrust washer with two radial surfaces and two end thrust washers, the end thrust washers each having an inner radial surface and an outer radial surface. The inner radial surfaces of the end thrust washers contact the radial surfaces of the middle thrust washer and the outer radial surfaces of the end thrust washers contact one of the bushing and the pinion gear. The radial surfaces of the middle thrust washer can have an antifriction coating. The inner radial surfaces of the end thrust washers can have an antifriction coating. The coefficient of friction between the outer radial surface of the end thrust washers and the bushing and the pinion gear are preferably greater than the coefficient of friction between the inner radial surfaces of the end thrust washers and the radial surfaces of the middle thrust washer.

The thrust washer structure of the present invention facilitates the use of an OILITE TM bushing in place of costly and delicate conventional or angular contact ball bearings. By placing the thrust washer structure between an OILITE TM bushing and a pinion gear having helical teeth on a center shaft of a fishing reel, the many advantages of the OILITE TM bushing may be enjoyed without causing excessive friction between the pinion gear and the OILITE TM bushing which can lead to binding between the OILITE TM bushing and the pinion gear and excessive reel gear wear and eventual premature failure of the reel.

DESCRIPTIONS OF THE DRAWINGS

FIG. 1 is an exploded, perspective view a closed-face spin cast fishing reel including the thrust washer structure according to the present invention;

FIG. 2 is a side elevation view illustrating the prior art use of an OILITE TM bushing between a reel deck plate and a pinion gear on a center shaft and having helical teeth thereon;

FIG. 3 is a side elevation view illustrating the thrust washer of the present invention and disposed between the pinion gear and an OILITE TM bushing;

FIG. 4 is an exploded elevation view of the thrust washers taken along line 4—4 of FIG. 3; and FIG. 5 is an exploded cross-sectional view of an alternative embodiment of the thrust washer structure of the present invention taken alone line 4—4 of FIG. 3.

DETAILED DESCRIPTION OF THE PREFERRED EMBODIMENT

A fishing reel 10 includes a cylindrical reel frame body or deck plate 12. The deck plate 12 is captively held between a threadably engaged cup-shaped front cover 14 and a cup-shaped back cover 16. The deck plate 12 has an axial cylindrical bore 18 extending therethrough. An integral boss 20 extends rearwardly from the deck plate 12. The integral boss 20 has a drive shaft bore 22 therethrough.

The reel 10 has a drive mechanism including a crank handle 24. A crank knob 26 is rotatably attached to one end of the crank handle 24. The other end of the crank handle 24 is connected to a drive shaft (not shown) which extends through the drive shaft bore 22 and axially engages a face gear 30. The face gear 30 has axially projecting teeth 32.

The drive mechanism further includes a center shaft 34. The center shaft 34 includes a keying portion 36. A threaded end 37 is located on the forwardly facing end of the center shaft 34. An enlarged head 39 is provided at the other end of the center shaft 34.

A pinion gear 40 has helical teeth 41 and an axial bore 42 having a cooperative cross section for making keyed connection with the keying portion 36 of the center shaft 34 to prevent relative rotation therebetween. The pinion gear 40 is splined on the keying portion 36 of the center shaft 34. Or, alternatively, the pinion gear 40 may be integrally formed on the center shaft 34. When the center shaft 34 is seated in the axial bore 18 of the deck plate 12, the helical teeth 41 of the pinion gear 40 cooperatively interengage the axially projecting teeth 32 of the drive gear 30.

Between a rearwardly facing surface 43 of the pinion gear 40 and the enlarged head 39 of the center shaft 34 is mounted a spring 44.

The center shaft 34 is axially inserted into the bushing 46 having an axial cylindrical bore 48 therein. Preferably, the bushing 46 is an OILITE TM bushing. The OILITE TM bushing 46 is nested in the cylindrical bore 18 of the deck plate 12. Located between a rearwardly facing surface 52 of the OILITE TM bushing 46 and a forwardly facing surface 54 of the pinion gear 34 are three thrust washers including end thrust washers 56, 58 and a middle thrust washer 60.

Threadably engaged to the threaded end 37 of the center shaft 34 is a spinner head 64. The spinner head 64 includes a retractable pickup pin 65 which holds the line L on the spinner head 64 to cause the spinner 64 to wrap line onto a spool (not shown).

FIG. 1 illustrates a preferred embodiment of the thrust washer structure of the present invention wherein three thrust washers are disposed between the rearwardly facing surface 52 of the OILITE TM bushing 46 and a forwardly facing surface 54 of the pinion gear 40. The present invention also contemplates the use of any number of thrust washers of one or greater.

As best seen in FIG. 4, the middle thrust washer 60 has two axially facing surfaces 66,68. The end thrust washer 58 has an inner axially facing surface 70 and an outer axially facing surface 72. Similarly, the end washer 56 has an inner axially facing surface 74 and an outer axially facing surface 76. As is readily apparent, the inner axially facing surface 70 of the end thrust washer 58 contacts the axially facing surface 66 of the middle thrust washer 60 and the inner axially facing surface 74 of the end thrust washer 56 contacts the other axially facing surface 68 of the middle thrust washer 60 defining a pair of interfaces. The outer axially facing surface 72 of the end thrust washer 58 contacts the forwardly facing surface 54 of the helical pinion gear 40 and the outer axially facing surface 76 of the end radial washer 56 contacts the rearwardly facing surface 52 of the OILITE TM bushing 46.

In a highly preferred embodiment of the present invention, the thrust washers 56, 58, 60 are made of a hardened steel such as a spring steel. Stainless steel has also been found effective, but not as effective as a hardened spring steel. A beryllium copper alloy may also yield satisfactory results.

The middle washer 60 may be made of plastic. Any plastic having high lubricity and low wear characteristics may be used. Examples of plastics which should function acceptably include nylon, VESPEL TM, DURACON TM and DELRIN TM. A thrust washer structure wherein each of the washers are made of such plastics is also within the scope of the present invention.

Another preferred embodiment of the present invention contemplates the use of an antifriction coating 78 between the axially facing surfaces 66,68 of the middle thrust washer 60 and the inner axially facing surfaces 70,74 of the end thrust washers 58,56 respectively. As illustrated in FIG. 4, the antifriction coating 78 may be applied on the axially facing surfaces 66,68 of the middle thrust washer 60 and the inner axially facing surfaces 70,74 of the end thrust washers 58,60 respectively. The invention also contemplates the antifriction coating being only on the axially facing surfaces 66,68 of the middle thrust washer 60 (see FIG. 5). The antifriction coating 78 may take forms, including TEFLON TM, silicone or molybedimum disulfide.

The present invention further contemplates a structure for increasing the coefficient of friction of the outer axially facing surfaces 72,76 of the end thrust washers 58,56 respectively. For example, as illustrated in FIG. 4, the outer axially facing surfaces 72,76 of the end thrust washer 58,56 may be roughened as shown at 80. Adhering the outer axially facing surface 72 of the end thrust washer 58 to the forwardly facing surface 54 of the pinion gear 40 and adhering the outer axially facing surface 76 of the end thrust washer 56 to the rearwardly facing end 52 of the OILITE TM bushing 46 by gluing, staking or some other structure is also within the scope of the present invention.

Any combination of toughening the outer axially facing surfaces 72,76 of the end thrust washers 58,56, applying an antifriction coating to the interface defined by the inner axially facing surfaces 70,74 of the end thrust washers 58,56 and the axially facing surfaces 66,68 middle thrust washer 60 or thrust washer materials may be employed, the desired result being to assure that the coefficient of friction between the middle thrust washer 60 and the end thrust washers 58 is less than the coefficient of friction between the end thrust washer 58 and the rearwardly facing surface 52 of the OILITE TM bushing 46. It is also desirable that the coefficient of friction between the outer axially facing surface 76 of the end thrust washer 56 and the forwardly facing surface 54 of the pinion gear 40 is greater than coefficient of friction between the middle thrust washer 60 and the end thrust washer 56.

Briefly, the operation of the fishing reel 10 can be described as follows. The center shaft 34 is biased rearwardly by the spring 44. Depression of a thumb button 81 by a user pushes the center shaft 34 forward relative to the deck plate 12. The spinner head 64 attached to the forward threaded end 62 of the center shaft 34 is thereby pushed forward against an inside rearwardly facing surface on the front cover 14. Line L is then trapped between the spinner head and the front cover 14 to prevent the line L from being payed out from the line spool (not shown). Forward displacement of the spinner head 66 also causes the pick-up pin 65, which normally projects radially through the spinner head 64, to be withdrawn to thereby allow the line L to freely uncoil from the spool. When the line L is to be cast forward, the user releases the thumb button 80, causing the spinner head 64 to move rearwardly relative to the front cover 14 by action of the spring 44, thereby allowing the line L to be payed out from the line spool. After the line L has been payed out, the user rotates the handle in a line retrieving direction which causes the pick-up 65 pin on the spinner head 64 to project through the spinner head 64 to thereby pick up the line L.

Retrieval of the line L is affected by continuous rotating of the center shaft 34 by means of the crank handle 24. More particularly, rotating the crank knob 26 rotates the crank handle 24 which in turn rotates the drive shaft (not shown). The drive shaft in turn causes rotation of the drive gear 30. The axially projecting teeth 32 of the drive gear 30 cooperatively engage the helical teeth 41 of the pinion gear 40, causing the pinion gear 40 to rotate which rotates the center shaft 34 which in turn rotates the spinner head 64. Rotating the spinner head 64 in the line retrieving direction causes the pick-up pin 65 to wind the line L onto the line spool.

As seen in FIGS. 2 and 3, during rotation of the drive gear 30 in the line retrieving direction 82, the helical angle of the helical teeth 41 of the pinion gear 40 causes a forward thrust 84 of the pinion gear 40 against the deck plate 12. In the prior art illustrated in FIG. 2, this forward thrust is directly opposed by the rearwardly facing surface 52 of the OILITE TM bushing 46. During prolonged periods of line retrieval, such as when line is being retrieved to recover a fish, excessive heat is generated by frictional forces caused by the forward thrust of the pinion gear 40 against the rearwardly facing edge 52 of the OILITE TM bushing 46 and the rotation of the pinion gear 40. Eventually, this excessive heat leads to depletion of the lubricant permeated into the OILITE TM bushing 46 around the rearwardly facing surface 52 of the OILITE TM bushing 46 which increases coefficient of friction between the OILITE TM bushing 46 and the pinion gear 40. The resultant increased frictional resistance to rotation of the center shaft 34 leads to binding of the reel 10, excessive wear on the gear teeth 41,32 and eventual failure of the reel 10.

The thrust washers 56,58,60 of the present invention maintain a low coefficient of friction between the pinion gear 40 and the OILITE TM bushing 46. The thrust washers 56, 58, 60 of the present invention are illustrated in FIG. 3. Upon rotation of the drive gear 30 in a line retrieving direction 82, the forward thrust 84 of the pinion gear 40 is met by the thrust washers 56, 58, 60. Because the coefficient of friction between the inner axially facing surfaces 70,74 of the end thrust washers 58,56, respectively, and the axially facing surfaces 66,68 of the middle thrust washer 60 is less than the coefficient of friction between the outer axially facing surfaces 72,76 of the end thrust washers 58,56, respectively, and the forwardly facing surface 54 of the pinion gear 40 and the rearwardly facing surface 52 of the OILITE TM bushing 46, slippage occurs between the thrust washers 56,58,60 and not between the OILITE TM bushing 46 and the pinion gear 40 or between the OILITE TM bushing 46 and the thrust washers 56,58,60. As a result, excessive heat build-up does not occur in the rearwardly facing surface 48 of the OILITE TM bushing 46 and therefore rapid depletion of the lubricant in the OILITE TM bushing does not occur. Therefore, line retrieval is smoother over the life of the reel 10 and premature failure of the reel 10 due to sticking between the OILITE TM bushing 46 and the pinion gear 40 is prevented.

The thrust washer structure of the present invention facilitates the use of an OILITE TM bushing in place of costly and delicate conventional or angular contact ball bearings. The thrust washer structure provides an inexpensive structure for minimizing frictional forces resisting rotation of the center shaft while the center shaft is under an axial load. Thus, the thrust bearing structure of the present invention facilitates smooth rotation of the center shaft even under axial loads and decreases wear on the reel gears, thereby extending the functional life of a fishing reel.

I claim:

1. A fishing reel comprising:
    a deck plate defining an axial bore extending from a rearward to a forward facing surface of the deck plate;
    a bushing defining an axial cylindrical bore disposed within the axial bore of the deck plate, the bushing having a rearward facing surface corresponding to the rearward facing surface of the deck plate;
    a center shaft disposed within the cylindrical bore of the bushing;
    a helical pinion gear non-rotatively attached to the center shaft having a forward facing surface in abutment with the rearward facing surface of the bushing;
    a driving gear operatively engaging the helical pinion gear to rotate the center shaft in a first direction, whereby the helical pinion gear has a forward thrust toward the rearward surface of the bushing as an incident of the pinion gear being driven by the driving gear in the first direction first and second thrust washers, each having two axially facing radial surfaces, one radial surface of the first thrust washer being in contact with the rearward facing surface of the bushing and one radial surface of the second thrust washer being in contact with the forward facing surface of the pinion gear, the other radial surface of each thrust washer being in abutment; and means on the thrust washers for preventing relative rotational movement between the one radial surface of the first thrust washer and the rearward facing surface of the bushing upon rotation of the pinion gear in the first direction.

2. The fishing reel of claim 1 wherein the relative movement preventing means comprises a coefficient of friction between the one radial surface of the first thrush washer and the rearward facing surface of the bushing being greater than the coefficient of friction between the abutting surfaces of the first and second thrust washers.

3. The fishing reel of claim 1 further comprising a third thrust washer between the first and second thrust washers with the other radial surface of each of the first and second thrust washers abutting a distinct one of the radial surfaces of the third thrust washer.

* * * * *